US006392374B1

(12) United States Patent
Menetrier et al.

(10) Patent No.: US 6,392,374 B1
(45) Date of Patent: May 21, 2002

(54) DEVICE FOR CONTROL OF AN ELECTRIC MOTOR DRIVING A MOVING OBJECT

(75) Inventors: Didier Menetrier, Marignier; Norbert Dupielet, Sallanches, both of (FR)

(73) Assignee: Somfy, Cluses (FR)

( * ) Notice: Subject to any disclaimer, the term of this patent is extended or adjusted under 35 U.S.C. 154(b) by 0 days.

(21) Appl. No.: 09/240,240

(22) Filed: Jan. 30, 1999

(30) Foreign Application Priority Data

Feb. 10, 1998 (FR) ........................................... 98 01534

(51) Int. Cl.[7] ................................................. G05B 5/00

(52) U.S. Cl. ....................... 318/446; 318/468; 318/282; 318/286; 49/28

(58) Field of Search ................................ 318/250–300, 318/445–448; 49/26, 28

(56) References Cited

U.S. PATENT DOCUMENTS 3,702,430 A * 11/1972 Knetsch ...................... 318/468
4,888,531 A * 12/1989 Hormann .................... 318/282

FOREIGN PATENT DOCUMENTS

| | | |
|---|---|---|
| DE | 27 34 512 | 2/1979 |
| DE | 42 30 729 | 3/1993 |
| EP | 0 703 344 A1 | 3/1996 |

* cited by examiner

*Primary Examiner*—David S. Martin
(74) *Attorney, Agent, or Firm*—Bugnion S.A.; John Moetteli

(57) ABSTRACT

The control device includes a switch (12) controlling the power supply to the motor and an actuator which actuates this switch by rotatably reacting against the moving object being restrained so as to cause said switch to be opened and to cut off the power supply to the motor. This actuator consists of a bistable mechanical device (11) capable of taking up a first state in which the switch (12) is closed and a second state in which the switch is open. The actuating device also includes a cable (17) for putting the actuating device into its first state, this device being brought into its second state by reacting against the moving object.

8 Claims, 7 Drawing Sheets

DEVICE FOR CONTROL OF AN ELECTRIC MOTOR DRIVING A MOVING OBJECT

BACKGROUND OF THE INVENTION

The subject of the present invention is a device for control of an electric motor driving a moving object, for example a roller shutter or a door.

Such a device is known from the DE patent application 27 34 512. In this device, the switch controlling the power supply to the motor is open at rest, and it is closed by a centrifugal mechanism driven by the motor, the starting of the motor being undertaken by a delayed-drop-out start-up relay controlled by a manual push-button switch. The means of starting up the motor and the means of automatic stopping in the event of excess torque are thus combined, but in addition to its relative complexity, such a device requires special-purpose wiring for supplying the start-up relay.

A control device for a motorized roller shutter is also known from the patent EP 0 703 344, operating by detecting a sudden increase in the resisting torque exerted by the roller shutter on the motor. To this end, the chassis of the motor is mounted so that it can rotate and its rotation is limited by two springs acting in opposition and determining the excess torque to be reached in each direction of rotation for the rotation of the chassis to actuate a switch which cuts off the power supply to the motor. The reacting against the moving object may be caused either by its arrival at end-of-travel, or by an obstacle. Starting up the motor is carried out, in the conventional way, by means of a switch.

SUMMARY OF THE INVENTION

A device is provided for control of an electric motor driving a moving object, for example a roller shutter or a door, comprising a switch controlling the power supply to the motor and means for actuating this switch reacting to the moving object being restrained, particularly by an obstacle, so as to cause said switch to be opened and to cut off the power supply to the motor, these actuating means comprising a mechanical actuating device capable of taking up a first state in which the switch is closed and a second state in which the switch is open, and means for putting the mechanical actuating device into its first state, the actuating device being brought into its second state by the reacting against the moving object.

The object of the present invention is also to combine the means for automatic stopping of the motor with the manual control of the starting up of the motor, but via simple mechanical means requiring no auxiliary wiring and using a mechanical manual control, such as a rod control, with a cable or a cord.

The control device according to the invention is characterized by the fact that the mechanical actuating device is a bistable device and in that the means for putting the actuating device into its first state are exclusively manual.

The invention is applicable equally to a motor with one direction of rotation and to a motor with two directions of rotation.

The device requires no external wiring other than that necessary for supplying power to the motor. Installation is thereby simplified.

In its simplest execution, the actuating device is a rotating cam actuating a monostable switch and having, on its periphery, a notch with an angular width corresponding to the rotation of the cam which is necessary for actuating the switch and in which a spigot of the casing of the motor is engaged for driving it when the casing of the motor is driven in rotation, against the action of a spring, by the resisting torque.

According to another embodiment, the bistable mechanical device consists of a cylindrical part which is movable in translation and in rotation within a fixed cylindrical tubular part to which it is linked by the interaction of at least one stud guided by at least one ramp, this moving part being, on the one hand, pushed by a spring in the direction of the switch and, on the other hand, linked to a pulling element which can be actuated manually, making it possible to exert a pulling force opposite to the thrust of the spring, the device being brought into its second stable state either by the rotation of the casing of the motor against the action of a spring, this rotation of the casing being caused by the resisting torque created by said moving object being restrained, or by a further pulling force on the pulling element.

BRIEF DESCRIPTION OF THE DRAWING(S)

The attached drawing, by way of example, represents three embodiments of the invention, as well as two embodiment variants of the first embodiment.

FIG. 1 represents a theoretical diagram illustrating the philosophy of the control device according to the invention.

FIG. 2, by way of reminder, represents the diagram of an electric motor used in the two embodiments described.

FIG. 3 is a partial view, in perspective, of the first embodiment.

FIGS. 4*a*, 4*b*, 4*c*, 4*d* and 4*e* represent five successive states of the bistable device used in the embodiment represented in FIG. 3.

DETAILED DESCRIPTION OF THE PREFERRED EMBODIMENT(S)

Figure 1:
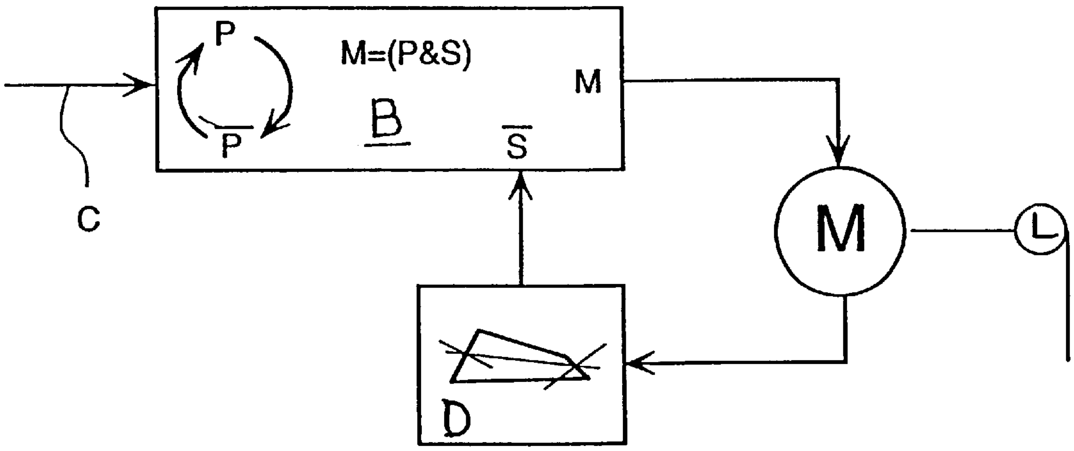

In FIG. 1, C designates a manual control, for example a flexible cord to be pulled or a rigid rod to be pushed/pulled, B is a bistable actuating device, M a motor the casing of which can pivot about the axis of the motor against the action of a retaining spring, and D a detector of the angular offset between the casing of the motor M and a fixed point. The motor M drives a load L, for example a roller shutter. Assuming initially that the power supply switch of the motor is open, that is to say that the actuating device B is in a stable state P, action by the user on the control C has the effect of causing the bistable device B to switch over from its state P into its state P. If, in this state, the angular offset detector D does not detect any angular offset, the motor M is energized. This function can be expressed M=(P & S).

When the detector D detects an angular offset of the casing of the motor, it sends out a stop signal S to the bistable device B which then switches over into its state P. The motor M is no longer supplied with power.

Figure 2:
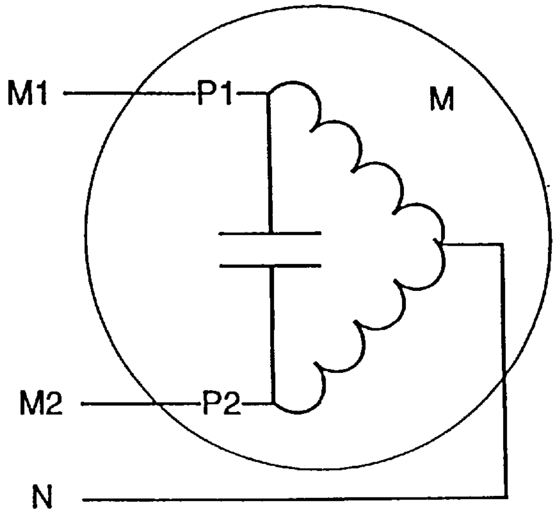

The motor represented in FIG. 2 is a conventional single-phase motor with two windings and a phase-shifting capacitor, in which each of the windings acts as an auxiliary winding according to whether the power supply voltage is applied between P1 and N or P2 and N.

The first embodiment will be described in connection with FIGS. 3 and 4*a* to 4*e*.

Figure 3:
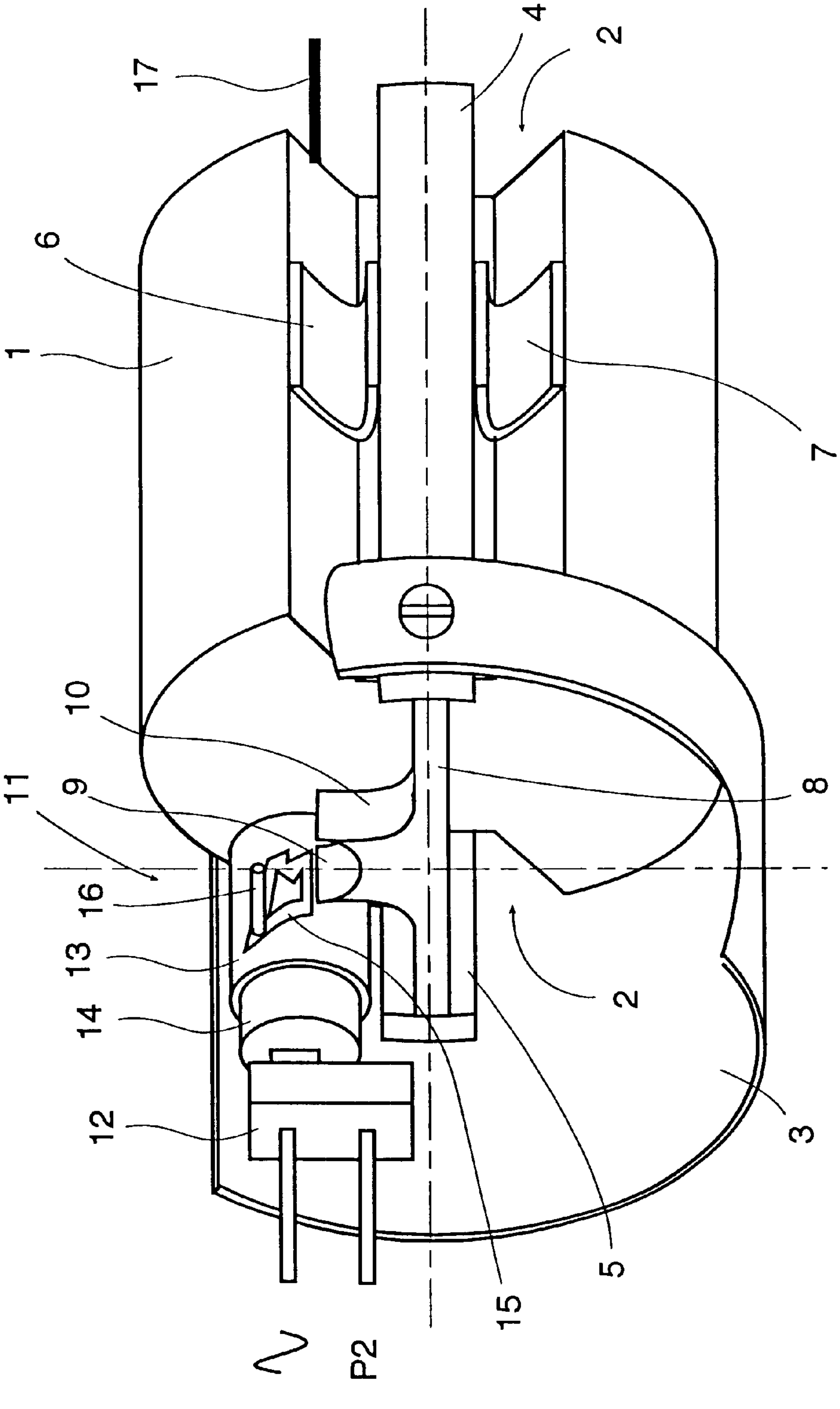

In FIG. 3, a cylindrical support 1 is represented, constituting a fixed point, for example one of the supports of the tube for winding a motorized roller shutter. This cylindrical support 1 has two diametrally opposed longitudinal slots 2. Coaxially with the cylindrical support 1, and in the extension thereof, is a cylindrical sleeve 3 integral with the casing of the motor (not represented), capable of constituting the extension of this casing. The other end of the casing of the motor is held so as to be able to turn freely about is axis. The sleeve 3 is extended by two longitudinal bars 4 and 5 fixed rigidly to the sleeve 3 and extending respectively in each of the slots 2 of the fixed cylinder 1. These bars 4 and 5 are held, in angular terms, by means of a pair of springs in a V, 6 and 7, inserted between each bar and the walls of the corresponding slot 2. The casing of the motor is thus held in position elastically, in angular terms. The bars 4 and 5 are additionally linked by a crosspiece 8 within the sleeve 3. This crosspiece 8, in its mid-part, carries a pair of cams 9 and 10 arranged symmetrically relative to a plane passing through the axis of pivoting of the sleeve 3. The cam 9 is intended to interact with a first bistable actuating device 11 and the cam 10 to interact with a second bistable actuating device, not represented, arranged, like the cams 9 and 10, symmetrically relative to the same diametral plane of symmetry. The bistable device 11 actuates a switch 12 which controls the power supply of the motor for one of the directions of rotation. The other bistable device controls a second switch identical to the switch 12 and mounted, like the bistable device, symmetrically relative to the same plane of symmetry.

The bistable device 11 consists of a fixed tubular cylindrical part 13 and of a cylindrical part 14 which is movable in rotation and in translation in the part 13. The wall of the fixed part 13 is pierced by a slot 15 forming a circuit of ramps and traps for a radial spigot 16 fixed to the movable part 14 passing through the slot 15 with a slight clearance and extending radially outside the part 13 so as to be able to be driven by the cam 9, as far as the bistable 11 is concerned. The movable part 14 is linked to one end of a rod or cable 17 so as not to be impeded in its rotation. The movable part 14 is furthermore subject to the action of a spring 18 working in compression and tending to push the part 14 toward the switch 12.

The operation of this embodiment will be described in connection with FIGS. 4*a* to 4*e*.

Figure 4A:
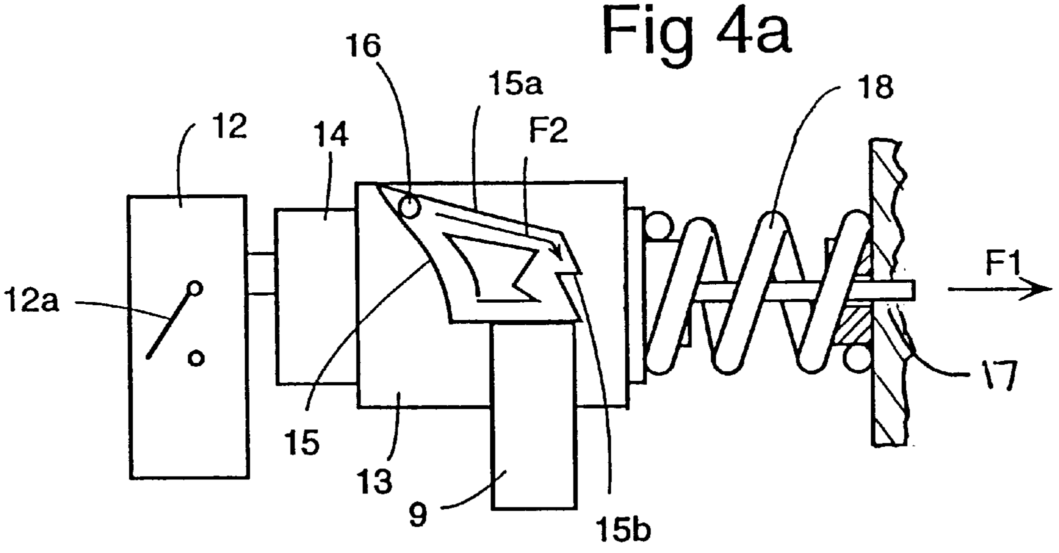

In the position represented in FIG. 4*a*, the spigot 16 of the movable part 14 of the bistable is held by the spring 18 in the left-hand end of the circuit 15 close to the switch 12. The part 14 bears against the pusher of the switch 12 and its contact 12*a* is open: the motor is not supplied with power. If the user pulls on the rod 17 in the direction of the arrow F1, the part 14 is pulled backwards. During this movement, its spigot 16 slides along the ramp 15*a*, driving the part 14, as indicated by the arrow F2. The spigot 16 finally comes into abutment against the stop 15*b*.

Figure 4B:
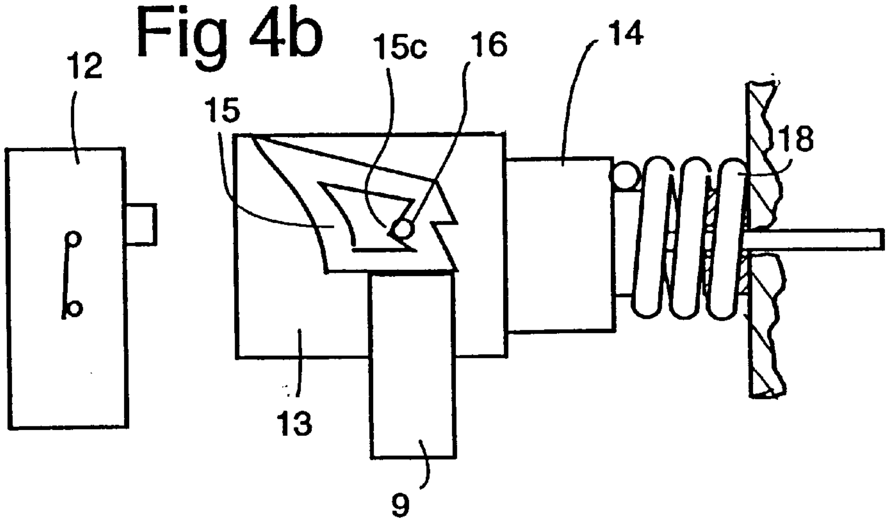

When the pulling force on the rod 17 is released, the spigot 16 becomes engaged in the trap 15*c* of the circuit 15, as represented in FIG. 4*b*. The bistable device is then in its second stable state. The part 14 is moved away from the switch 12, its contact is closed and the motor is supplied with power.

Figure 4C:
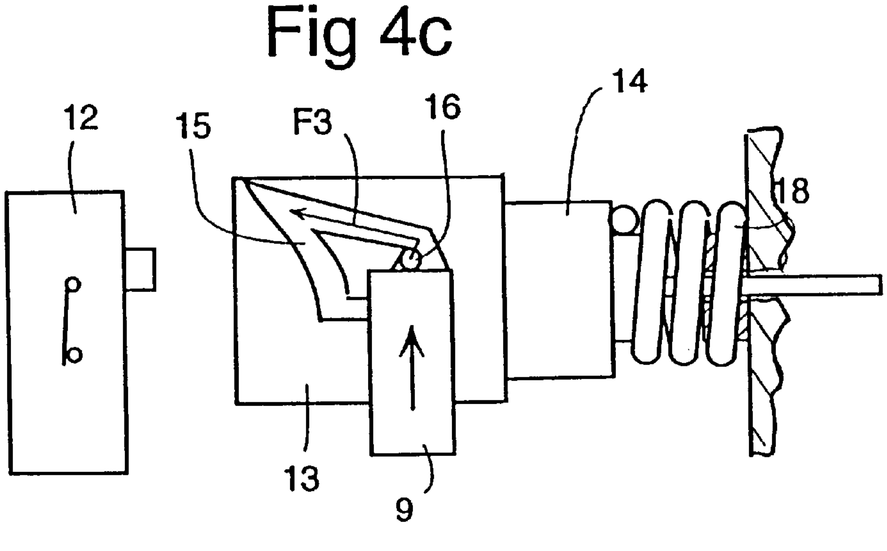

If the casing of the motor is then driven in rotation by the reacting against the moving object driven by the motor, for example by the arrival in abutment against the box housing of the end of a roller shutter while it is being wound, the sleeve 3 pivots against the action of one of the springs 6 or 7, for example the spring 7, and the cam 9 drives the spigot 16 which escapes from its trap 15*c* so as to come back to its first stable position along the groove 15, as indicated by the arrow F3, FIG. 4*c*, under the thrust from the spring 18. The switch 12 is then actuated, its contact 12*a* opens and the power supply to the motor is cut off.

Figure 4D:
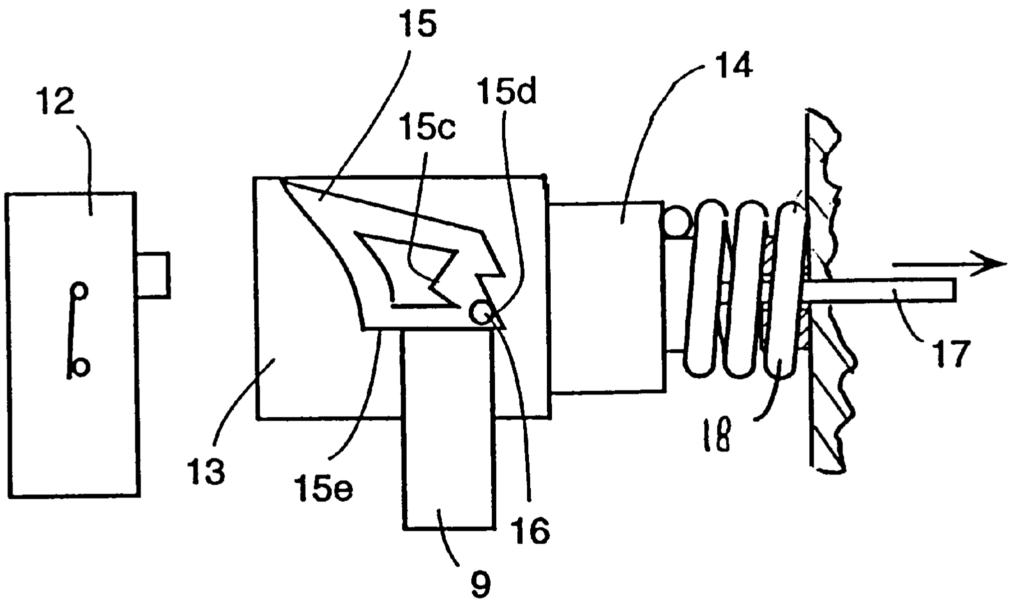
Figure 4E:
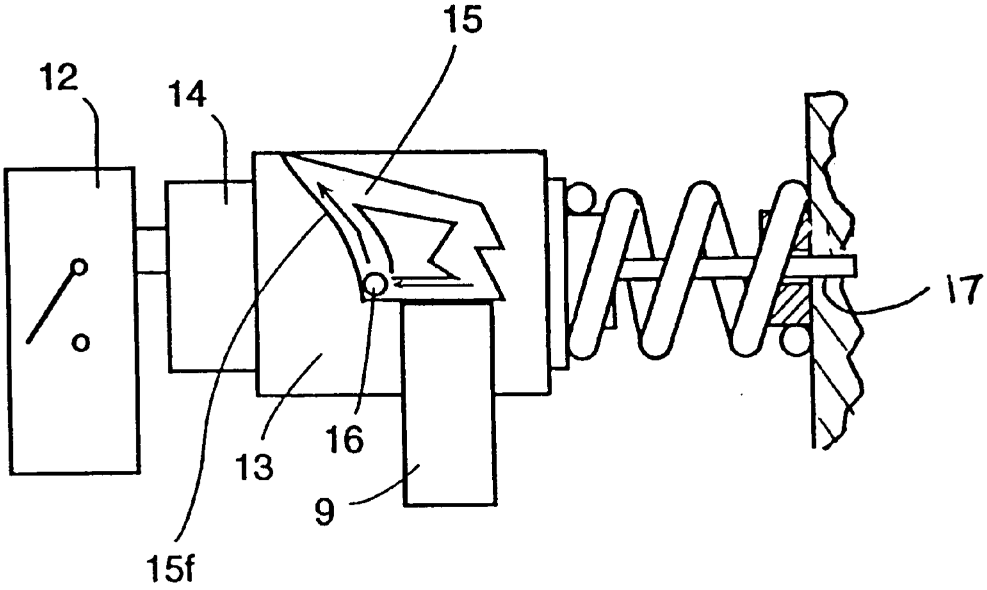

Stopping can also be controlled manually by pulling on the rod 17. The bistable device 11 operates in this case as represented in FIGS 4*d* and 4*e*. When there is a pulling force on 17, the spigot 16 comes into abutment against the ramp 15*d* which moves away from the trap 15*c*. Once released, the spigot 16 moves axially along 15*e*, the ramp 15*f* and brings it back into its position represented in FIG. 4*a*.

If the two bistable actuating devices equipping the control device are independent, nothing prevents the user simultaneously actuating these two bistable devices, that is to say giving two contradictory orders. This can be avoided mechanically or electrically.

Figure 5:
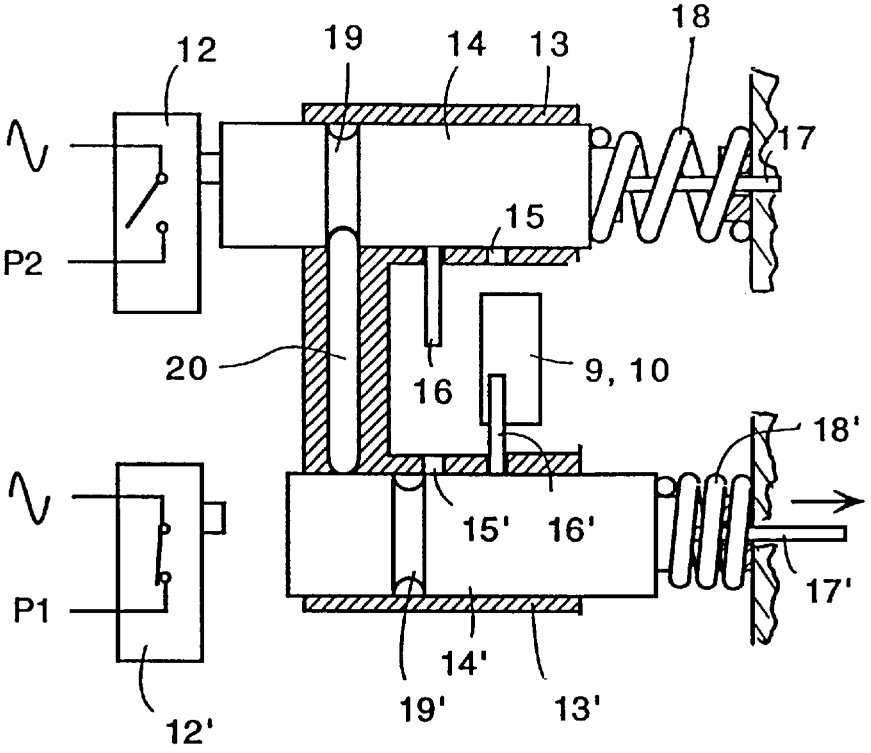
FIG. 5 represents a first embodiment variant, and a first improvement respectively, of the first embodiment.

FIG. 5 illustrates a mechanical solution. The moving parts 14 and 14' of the two bistable devices have an annular groove 19, 19' respectively. Between the two moving parts 14 and 14' a slider 20 is mounted, capable of sliding transversely between the two bistable devices and of engaging alternately in the grooves 19 and 19'. The length of this carriage 20 is such that it is always engaged in one of the grooves 19 or 19'. In the position represented in FIG. 5, the carriage 20 is engaged by one of its ends in the groove 19 of the moving part 14, while its other end abuts against the cylindrical surface of the moving part 14'. The part 14 is thus locked, so that a pulling force on its rod 17 has no effect. In contrast, as soon as the part 14' comes into abutment against the switch 12', the part 14 is freed.

Figure 6:
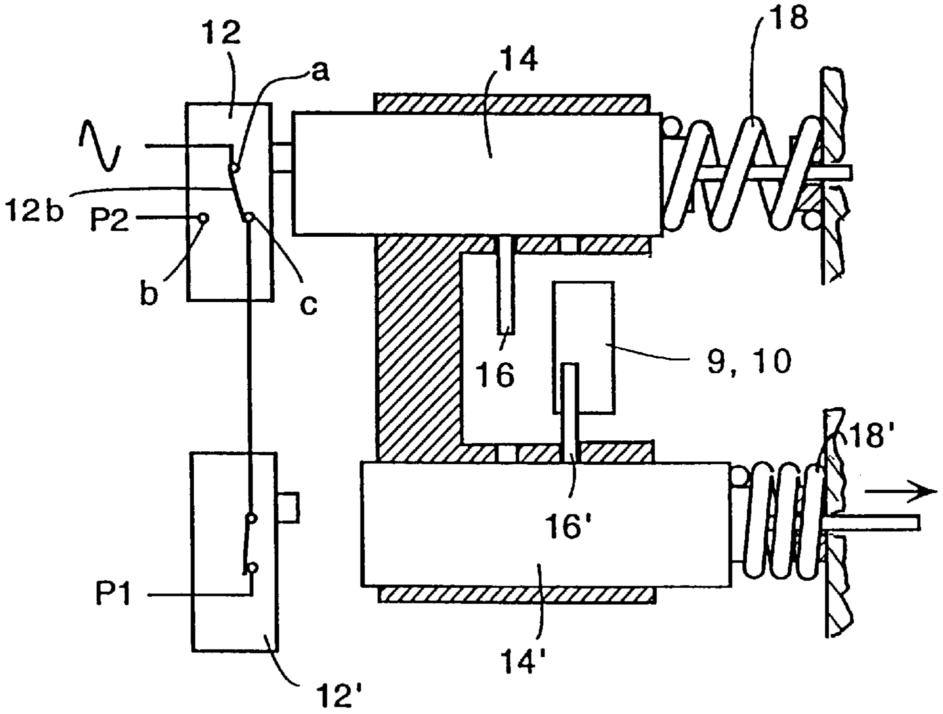
FIG. 6 represents a second variant of the first embodiment.

An electrical solution is represented in FIG. 6. One of the switches, for example the switch 12, is equipped with an inverter contact making it possible to link terminal a either to terminal b or to terminal c, this terminal c being linked to the switch 12' in such a way that the closing of the switch 12' is effective only if the switch 12 is actuated and conversely, the actuation of the switch 12 having the effect of bringing the contact 12*b* into the position represented and its release having the effect of bringing it back to the terminal b.

Figure 7:
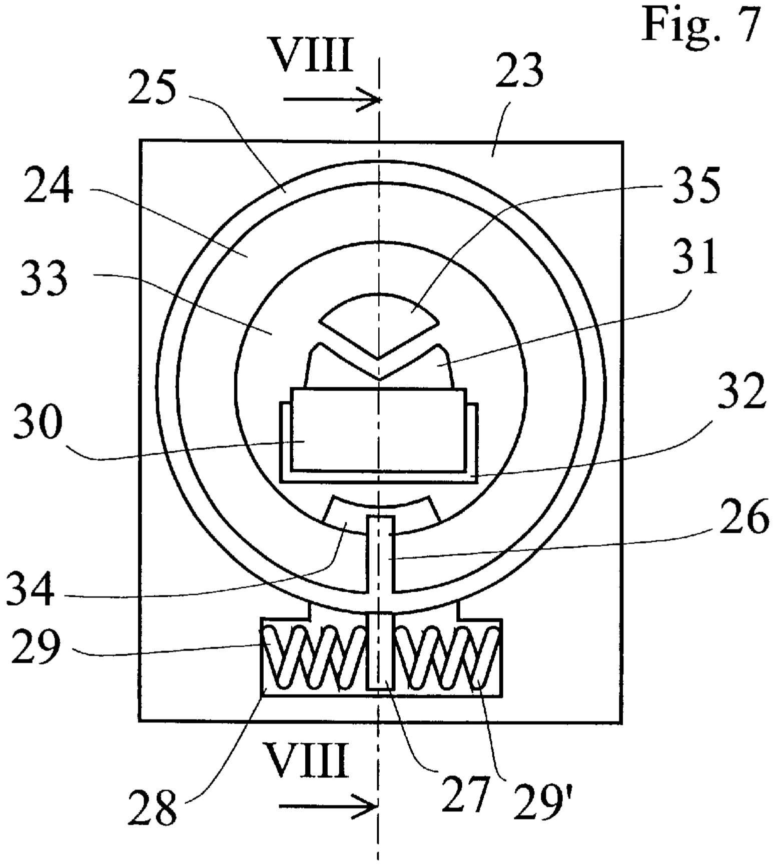
FIG. 7 is a diagrammatic view in a radial section of a second embodiment applied to the case of a roller shutter.
Figure 8:
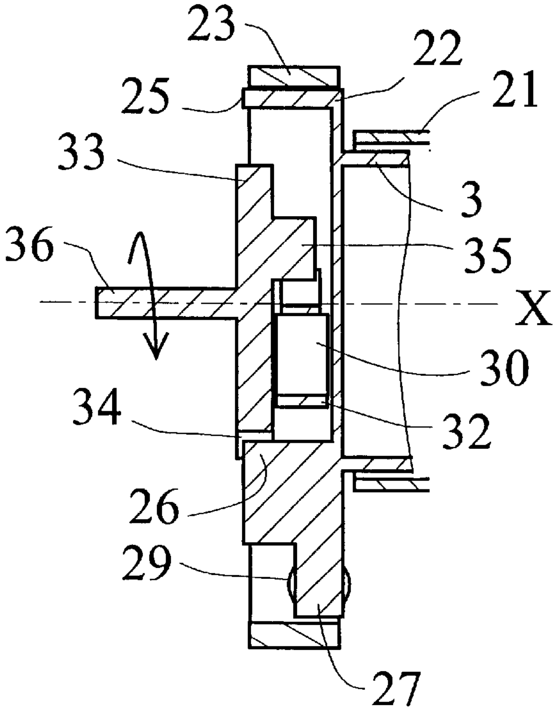
FIG. 8 is a view in section along VIII—VIII of FIG. 7.

The second mode will now be described in connection with FIGS. 7 and 8.

These figures represent one of the ends of a roller shutter installation mounted in a window aperture. The casing 3 of the tubular motor is again visible, housed within a winding tube 21, shown in part, driven by the motor. The end of the casing 3 which is shown is equipped with a flange 22 by which it is mounted into a rectangular framework 23 complete with a main circular cutout 24. The flange 22 is equipped with a ring 25 engaged in the circular cutout 24 in which it can turn freely. At its lowest point, the ring 25 is fitted with a first spigot 26 turned toward the center of the ring and with a second radial spigot 27 turned outward, in a rectangular cutout 28 of the framework 23 in which two springs 29 and 29' are housed, working against each other in compression and bearing on each of the sides of the spigot 27. In the center of the ring 25 a switch 30 is fixed, equipped with a bistable latch 31, that is to say a switch with a central terminal and two contacts for making an electrical connection between the central contact and one or the other of the contacts alternately, that is to say either between N and M1 or N and M2 (FIG. 2) so as to make the motor turn in one direction or the other. The visible part of the latch 31 has the profile of an obtuse V. The switch 30 is carried by a support 32 fixed to the framework 23. Coaxially with the axis X of the motor and of the winding tube, a cam 33 is mounted exhibiting, in its lower part, a notch 34 extending over a well-defined angle, and a projecting part 35 in the form of a dihedron with an angle equal to the angle of the V-shaped profile of the latch 31 of the switch and engaged in this profile. The spigot 26 is engaged in the notch 34. The space between each of the ends of the notch 34 and the spigot 26 is equal to the angular displacement of the cam 33 which is necessary for actuating the latch 31, that is to say for closing of the switch 30 in one position or the other. The cam 33 can be driven manually in rotation by a shaft 36. In order not to risk damaging the switch 30, the link between the shaft 36 and the cam 33 is an elastic or friction link.

The device is represented at rest, motor stopped. In order to start up the motor, the user turns the shaft 36 in one direction or the other, according to the desired direction of rotation of the motor. The rotation of the cam 33 has the effect, on the one hand, of closing the switch via the dihedron 35 and, on the other hand, of bringing one of the sides of the notch 34 against the spigot 26. Let us suppose, for example, that the cam 30 was driven in the clockwise direction. It is therefore the right-hand end of the notch 34, FIG. 7, which comes into contact with the spigot 26. When a resisting torque manages to make the casing 3 turn in the anti-clockwise direction, by compressing the spring 29', the spigot 26 drives the cam 33 in rotation in the same direction, which has the effect of bringing the dihedron 35 into the position represented. The power supply to the motor is cut off. After the resisting excess torque disappears, the spring 29' brings the casing 3 back into the position represented.

In this mode of execution, the bistable device therefore consists of the switch itself.

Figure 9:
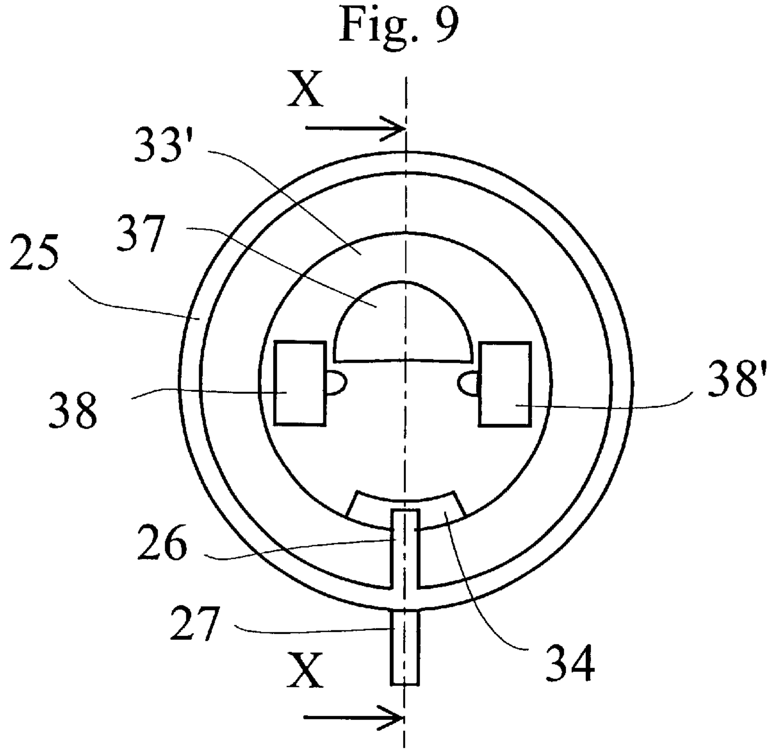
FIG. 9 is a partial diagrammatic view in a radial section of a third embodiment.
Figure 10:
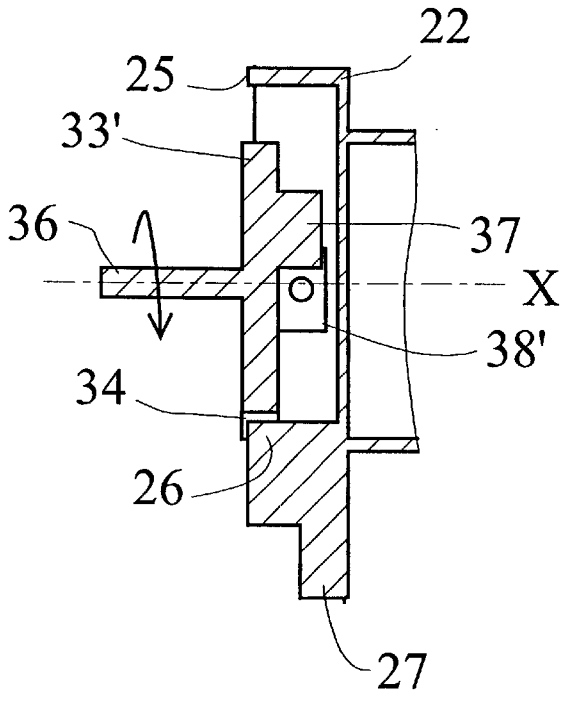
FIG. 10 is a section along X—X of FIG. 9

The third embodiment represented in FIGS. 9 and 10 is in fact an embodiment variant of the second embodiment and replicates the majority of the elements thereof, in particular the elements which are not represented. In FIG. 9, the ring 25 of the flange of the casing 3 can be seen with its radial spigots 26 and 27. The rotating cam 33' differs from the cam 33 in that it exhibits a projecting central part 37 engaged between two monostable switches 38 and 38' the contact of which is open at rest, in contrast to the switches 12 and 12' of the first embodiment. The projecting part 37 of the cam has a shape such that, at rest, the switches 38 and 38' are not actuated, although a rotational drive of the cam 33' by the shaft 36 actuates one or other of the switches via the part 37. It can therefore be seen that the part 37 can take various shapes, and that it could also be separated into two parts, for example two pips. Moreover, the outer contour of the cam 33', like that of the cam 33, may be of any shape, except for the notch 34.

The operation of this third embodiment is the same as that of the second embodiment, the only difference being that the bistability is provided here by the cam 33'. In the actuated position of one of the switches, the stability of the cam is ensured by the friction between the pusher of the switch and the cam. This stability could be increased by forming a slight recess in the part 37. The stability in the neutral position could be ensured by friction or by an auxiliary means such as an elastically mounted ball. By means of such a ball, it would be possible to provide stability of the cam 33', in its three positions. Such means could also be provided on a knob for driving the shaft 36.

The bistability can also be provided by offsetting the switches 38 and 38' downward, in such a way that their pushers are situated under the axis of pivoting of the cam 37.

Although illustrative embodiments of the invention have been shown and described, a wide range of modification, changes and substitutions is contemplated in the foregoing disclosure. In some instances, some features of the present invention may be employed without a corresponding use of the other features. Accordingly, it is appropriate that the appended claims be construed broadly and in a manner consistent with the scope of the invention.

What is claimed is:

1. A device for control of an electric motor driving a motor object, comprising a switch (12, 12') controlling a power supply to the motor and means for actuating the switch by reacting against the moving object so as to cause said switch to be opened and to cut off the power supply to the motor, these actuating means comprising:

(a) a mechanical actuating device (11) capable of taking up a first state in which the switch is closed and a second state in which the switch is open, and (b) means (17) for putting the mechanical actuating device into its first state, the actuating device being brought into its second state by reacting against the moving object, wherein the mechanical actuating device is a bistable device (11) and the means for putting the actuating device into its first state are exclusively manual, the control device further having a casing (3) which is capable of turning by a limited angle about the axis of the motor against the action of a retaining spring (6, 7) while under the effect of the resisting torque created by the reaction against said moving object, wherein the bistable mechanical device (11) comprises a cylindrical part (14) which is movable in translation and in rotation within a fixed cylindrical tubular part (13) to which it is linked by the interaction of at least one spigot (16) guided by at least one ramp (15), the cylindrical part (14) being pushed by a spring (18) in the direction of the switch and linked to a pulling element (17) which can be actuated manually, making it possible to exert a pulling force opposite to the thrust of the spring, the bistable device being brought into its second stable state either by the rotation of the casing of the motor against the action of its retaining spring, or by further pulling force on the pulling element (17), and wherein further, the bistable device (11) is mounted in the extension of the casing of the motor and its movable part (14) is equipped with a radial spigot (16) passing through a slot (15) of the fixed part forming a circuit of ramps and traps, this spigot being capable of being driven by an arm (8) integral with the casing of the motor when the bistable device (11) is in its first stable position and to allow the spring of the bistable device to push the moving part (14) into its second stable state, an escape being also possible as a result of a pulling force on the pulling element (17).

2. The control device as claimed in claim 1, for a motor with two directions of rotation comprising a second bistable device identical to the fist bistable device and wherein the radial spigot of which is driven by the rotation of the casing of the motor in the other direction.

3. The control device as claimed in claim 2, comprising means (20) for mutual locking of moving parts of the two bistable devices.

4. The control device as claimed in claim 3, wherein the mutual locking means consist of a carriage (20) which is movable transversely to said moving parts (14, 14') and which interacts with peripheral grooves (19, 19') of the moving parts, in such a way that the carriage is always held engaged in a groove of one of the moving parts under the effect of the other moving part and such that axial movement of the moving part in the groove in which it is engaged is prevented.

5. A device for control of an electric motor driving a moving object, comprising a switch (12, 12'; 30; 38, 38') controlling a power supply to the motor and means for actuating the switch by reacting against the moving object so as to cause said switch to be opened and to cut off the power supply to the motor, these actuating means comprising:

A mechanical actuating device (11; 33, 33') capable of taking up a first state in which the switch is closed and a second state in which the switch is open, and means (17; 36) for putting the mechanical actuating device into its first state, the actuating device being brought into its second state by rotatably reacting against the moving object, wherein the mechanical actuating device is a bistable device (11; 30; 37) and the means for putting the actuating device into its first state are exclusively manual, the device further having a casing (3) which is capable of turning by a limited angle about the axis of the motor against the action of a retaining spring (29, 29') under the effect of the resisting torque created by the reacting against said moving object, wherein the bistable device consists of a bistable switch (30) with a latch (31) fixed in the extension of the axis of the motor and actuated by a rotating cam (33, 35) kinematically linked to the latch of the switch and capable of being driven in rotation by the rotation of the casing of the motor, and wherein the means for putting the bistable device into its first stable state consist of a means (36) for driving said cam in rotation.

6. The device for control of a motor with two directions of rotation as claimed in claim 5, wherein the cam (33) has, on its periphery, a notch (34) with an angular width corresponding to the rotation of the cam which is necessary for actuating said latch (31) and wherein the casing of the motor (3) has a first radial spigot (26) engaged in said notch and a second radial spigot (27) engaged between two springs (29, 29'), the fist spigot being situated in the middle of said notch when the motor is at rest, with the switch open, and the cam in a central position, so that, when the switch is closed to one side or the other, one of the sides of said notch is at least approximately in contact with the first spigot of the casing, the rotation of the casing bringing the cam back into its central position.

7. A device for control of an electric motor driving a moving object, comprising a switch (12, 12'; 30; 38, 38') controlling a power supply to the motor and means for actuating the switch by reacting against the moving object so as to cause said switch to be opened and to cut off the power supply to the motor, these actuating means comprising:

a mechanical actuating device (11; 33, 33') capable of taking up a first state in which the switch is closed and a second state in which the switch is open, and means (17; 36) for putting the mechanical actuating device into its first state, the actuating device being brought into its second state by rotatably reacting against the moving object, wherein the mechanical actuating device is a bistable device (11; 30; 37) and the means for putting the actuating device into its first state are exclusively manual, the device further having a casing (3) which is capable of turning by a limited angle about the axis of the motor against the action of a retaining spring (29, 29') under the effect of a resisting torque created by the reacting against the moving object and in which said switch (38, 38') is a monostable switch open at rest, wherein the bistable device consists of a rotating cam (33') kinematically linked, with clearance, to the casing of the motor, this cam being capable of occupying a first angular position in which it actuates and closes the switch and a second position in which it does not actuate the switch, and wherein the means for putting the bistable device into its first stable state consist of a means (36) for driving the cam in rotation.

8. The device for control of a motor with two directions of rotation as claimed in claim 7, comprising two monostable switches (38, 38') which are closed alternately by said cam (33'), and wherein the cam has, on its periphery, a notch (34) with an angular width corresponding to the rotation of the cam which is necessary for actuating the two switches and wherein the casing (3) of the motor has a first radial spigot (26) engaged in said notch and a second radial spigot (27) engaged between two springs (29, 29'), the first spigot (26) being situated in the middle of said notch when the motor is at rest, with the switches open, and the cam being in a central position, so that, when one of the switches is closed, one of the sides of said notch is at least approximately in contact with the first spigot (26) of the casing, the rotation of the casing bringing the cam back into its central position.

* * * * *